March 28, 1961  A. M. ROSENBERG ET AL  2,977,559
LOW RESISTANCE ELECTROLYTIC TILT DEVICE
Filed May 29, 1959

INVENTORS
ANDREW M. ROSENBERG
JOSEPH R. CONWAY
HOWARD E. SCHULIEN
BY Herbert L. Davis
ATTORNEY

United States Patent Office 2,977,559
Patented Mar. 28, 1961

2,977,559
LOW RESISTANCE ELECTROLYTIC TILT DEVICE

Andrew M. Rosenberg, New York, N.Y., and Joseph R. Conway, River Vale, and Howard E. Schulien, Montville, N.J., assignors to The Bendix Corporation, a corporation of Delaware Filed May 29, 1959, Ser. No. 816,771
3 Claims. (Cl. 338—44)

The invention relates to an improved low resistance electrolytic tilt switch and more particularly to an electrolytic switch in which there is provided an armature cooperating with the switch terminals thereof so as to establish a path for the passage of current parallel to the passage of current through the electrolyte to the switch terminals and an arrangement in which the fluid space provides a cooling influence by acting primarily as a heat sink as the major current flows through the space directly between the armature and the switch terminals.

In the prior electrolytic type current control switch there is provided a glass container hermetically sealed after being partially filled with an electrolyte so as to leave an air bubble at the top and a pair of spaced electrodes or switch terminals near the top with which the bubble is arranged to cooperate upon a tilting of the container for controlling the flow of current between the two electrodes.

In the prior switch, the application of a voltage difference between the two switch terminals while the container is in a level position causes a current to pass through the electrolyte between the switch terminals. The electrolyte offers a resistance to the passage of this current such that a relatively large potential difference is required in comparison to the quantity of the current passed. Such passage of the required current is characterized by a marked heating effect. This effect is not desirable as it raises the temperature of the electrolyte in the container.

Moreover, an incremental increase in electrolyte temperature lowers the electrical resistance of this fluid an amount dependent on the absolute temperature of the fluid. As the temperature of the switch increases a point is reached at which an incremental temperature rise will have a negligible effect on conductivity. This condition, combined with the cooling effect of the ambient, establishes an equilibrium state enabling the switch to pass a steady current. The relative time required in the prior switch to effect the equilibrium current state is illustrated in the graph of Figure 1 by the line A, while the more rapid approach to the equilibrium current state effected through the control switch of the present invention is illustrated by line B.

The establishment of the equilibrium temperature state in the prior device, as illustrated by the line A in the graph of Figure 2, is time consuming due to the thermal conductivity of the electrolyte and of the glass of the sealed container. The time required to effect such equilibrium state varies directly with the temperature gradient between the ambient and heating center within the switch. It is desirable to decrease the time for establishing the equilibrium temperature state insofar as practicable as well as the temperature at the equilibrium state and this is accomplished by including in the electrolytic switch the features of the present invention so as to effect the improved temperature time characteristics illustrated graphically by the line B of Figure 2.

Moreover, in the prior type switch it has been found that the temperature changes within the range of 30° C. to 70° C. will substantially affect the size of the air bubble. Thus as the switch temperature increases, the incompressible electrolyte expands and reduces the bubble volume. Such bubble size variation can give rise to two undesirable switch characteristics, namely (1) loss of an on-off point, and (2) oscillatory on-off action.

From the foregoing, it will be seen that the size of the bubble in the electrolyte is directly affected by the temperature change thereof, and the temperature change in the electrolyte is in turn affected by the large amounts of power being dissipated in the electrolyte.

Inasmuch as the switch is designed to pass a definite amount of current, an object of the invention is to provide novel means for reducing undesirable heat dissipations in the electrolyte by lowering the internal switch resistance so that bubble size variation will be minimized.

Another object of the invention is to provide an electrolytic tilt switch including an element providing a low resistance path for the passage of current and extending in spaced relation to the switch terminals so as to provide a path for the passage of current parallel to the passage of current through the electrolyte between the two switch terminals, and an arrangement in which the fluid space provides a cooling influence as the major current flows through the electrolyte in the space directly between the switch terminals and the opposite ends of the low resistance path element, while there is only a minor flow of current through the electrolyte in the space immediately between the terminals.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings wherein like parts are marked alike:

Figure 3:
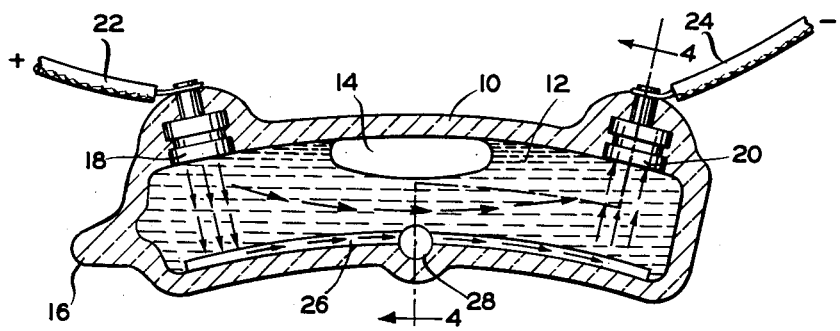
Figure 3 is a longitudinal sectional view of an electrolytic tilt switch embodying the present invention.
Figure 4:
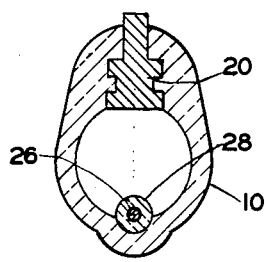
Figure 4 is a sectional view taken along lines 4—4 of Figure 3 and looking in the direction of the arrows.

Referring to the drawing of Figure 3, there is indicated by the numeral 10 a circular tube type glass housing or container of conventional type and filled with a suitable electrolyte 12 so as to leave an air bubble 14 at the top. The housing 10 is hermetically sealed by melting the tube at 16.

Embedded in the top of the housing 10 are electrodes 18 and 20 which may be formed of carbon or other suitable conductive material. Electrical conductors 22 and 24 lead from outer ends of the electrodes 18 and 20 to a source of electrical energy, not shown.

A novel feature of the invention resides in the provision of an armature member 26 formed of a suitable low resistance electrical conductive material, such as a bar of platinum shaped to conform to the inner bottom surface of the container 10 and extending in spaced relation to the switch contact terminals or electrodes 18 and 20. The member 26 is secured in position at the bottom of the housing 10 by a suitable fastening member 28.

In the aforenoted arrangement, it will be seen that as indicated by the arrows in Figure 3, the major portion of the current from the contact 18 will flow across a space between one end of the bar 26 and the contact 18 and through the bar 26 and across a space between the opposite end of the bar 26 and the contact terminal 20. Only a minor portion of the current will flow in a parallel path through the electrolyte of higher resistance between the contacts 18 and 20.

Figure 1:
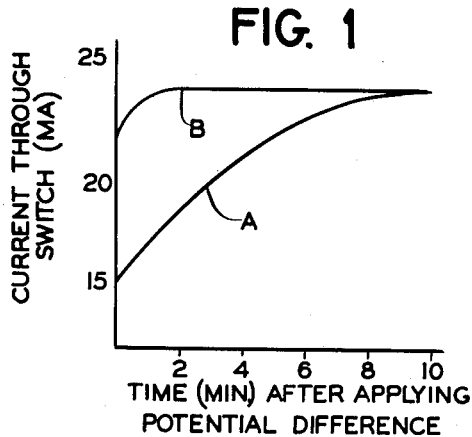
Figure 1 is a comparative graphical illustration of the time required to establish an equilibrium state in the flow of current through a prior type electrolytic tilt switch as illustrated by line A, and the equilibrium state of the flow of current through a similar type switch embodying the present invention, as illustrated by the line B.
Figure 2:
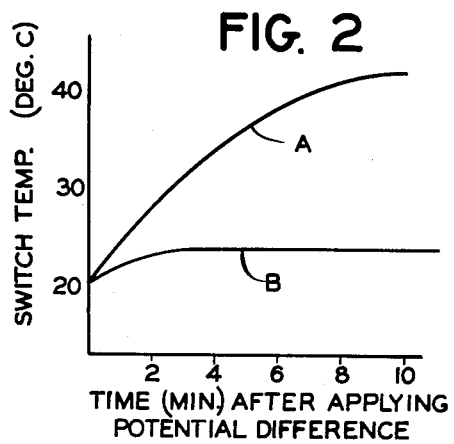
Figure 2 is a comparative graphical illustration of the time required to reach an equilibrium temperature state in the prior type electrolytic tilt switch as illustrated by line A and in the equilibrium temperature state of the similar type switch embodying the features of the present invention as illustrated by line B.

In the improved switch of Figure 3, the heat generated is materially decreased over that in the prior type switch not embodying the present invention. Moreover, as most of the heat is generated in the space directly between the armature or bar 26 and the contacts 18 and 20, the opportunity for faster cooling is present as the electrolyte in the adjacent space immediately between the terminals 18 and 20 contributes to the cooling influence by acting primarily as a heat sink inasmuch as only minute currents pass through it. Hence, as illustrated graphically by Figures 1 and 2, the current flow and temperature in the improved electrolytic switch will reach equilibrium states in shorter time than in an electrolytic switch of the prior type not embodying the features of the present invention.

Moreover, results of the tests on the improved electrolytic switch of Figure 3 have indicated no evidence of oscillatory on-off action or loss of an on-off point and only slight changes in current passing ability during thermal equilibrium establishment.

In the operation of the device of Figure 3, the sealed housing 10 is tiltable in opposite senses and to a variable extent so that the electrolytic liquid 12 partially filling the housing 10 provides a bubble 14 movable upon a tilting of the housing 10 along an upper inner surface of the housing. The electrodes 18 and 20 in the upper inner surface of the housing 10 provide surface area portions contactable with the electrolytic liquid for conducting a flow of electrical energy from one of the electrodes 18 to the other electrode 20. The bubble 14 in the upper surface of the electrolytic liquid is arranged so as to selectively contact the surface area portions of the electrodes to vary the contact of one or the other of the electrodes with the electrolytic liquid and thereby control the on-off action and the flow of electrical energy between the electrodes 18 and 20 dependent upon the sense and extent of the tilting of the housing 10.

Further there is provided the bar 26 formed of a relatively low resistance material such as platinum and mounted along a lower inner surface of the housing 10 and having opposite ends positioned in spaced relation immediately below the surface area portions of the electrodes 18 and 20. The bar 26 is in continuous contacting relation with the electrolytic liquid 12 so as to provide a low resistance path for the flow of electrical energy and a path parallel to the flow of electrical energy directly from the electrode 18 to the electrode 20 through the electrolytic liquid of higher resistance. The bar 26 is spaced a relatively short distance from the electrodes 18 and 20 as compared to the longer distance between the electrodes 18 and 20 so that a major portion of the flow of electrical energy is through the parallel path indicated in Figure 3 by the arrows and including the bar 26. Thus through the arrangement of the bar 26 in relation to the electrodes 18 and 20 and the electrolytic liquid 12 the heat generated is materially decreased and such heat as may be generated in the electrolytic liquid 12 directly between the bar 26 and the electrodes 18 and 20 is distributed throughout the greater quantity of the liquid in the sealed housing 10 so as to provide a desired cooling effect. Thus, through such arrangement of parts, the current flow and temperature in the improved current control device of the present invention will more rapidly reach the desired state of equilibrium than in the prior type device.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a device of a type including a sealed housing tiltable in opposite senses and to a variable extent, an electrolytic liquid partially filling said housing so as to provide a bubble in an upper surface of the liquid, said housing having an upper inner surface and a lower inner surface, a pair of spaced electrodes in the upper inner surface of the housing, each of the two electrodes having a surface area portion contactable with the electrolytic liquid for conducting a flow of electrical energy from one of the electrodes to the other of the electrodes, the bubble in the upper surface of the electrolytic liquid being normally positioned intermediate the electrodes in spaced relation thereto and movable relative thereto for selectively contacting the surface area portions of the electrodes so as to vary the contact thereof with the electrolytic liquid dependent upon the sense and extent of tilting of the housing; the improvement comprising a platinum bar in continuous contacting relation with the electrolytic liquid and extending longitudinally along the lower inner surface of the housing so as to provide a low electrical resistance path for shunting a path of higher electrical resistance provided by the electrolytic liquid, one end of the bar being positioned in spaced relation immediately below one of said electrodes, an opposite end of said bar being positioned in spaced relation immediately below the other of said electrodes, said electrodes being spaced apart a substantially greater distance than the total spatial distance of the bar from each of said electrodes, said bar being so arranged as to provide a low resistance path for a flow of electrical energy parallel to the flow of electrical energy through said path of higher electrical resistance, said parallel flow of electrical energy being from the one electrode through the electrolytic liquid to the one end of the bar, through the bar to the other end thereof, and from said other end of the bar through the electrolytic liquid to the other of said electrodes.

2. In a device of a type including a sealed housing tiltable in opposite senses and to a variable extent, an electrolytic liquid partially filling said housing so as to provide a bubble in an upper surface of the liquid, said housing having an upper inner surface and a lower inner surface, a pair of spaced electrodes in the upper inner surface of the housing, each of the electrodes having a surface area portion contactable with the electrolytic liquid, the electrolytic liquid for conducting a flow of electrical energy from one of the electrodes to the other of the electrodes, the bubble in the upper surface of the electrolytic liquid being normally positioned intermediate the electrodes and movable relative thereto for selectively contacting the surface area portions of the electrodes so as to vary the contact thereof with the electrolytic liquid dependent upon the sense and extent of tilting of the housing; the improvement comprising a longitudinally extending member of a low resistance electrically conductive material, said member extending in spaced relation to the surface area portions of the electrodes so as to provide a low resistance path for shunting a path of higher electrical resistance provided by the electrolytic liquid, one end of said member being spaced from the surface area portion of one of the electrodes and the opposite end of said member being spaced from the surface area portion of the other of said electrodes so that electrical energy may flow in a low resistance path parallel to the flow of electrical energy through said path of higher electrical resistance and serially from said one electrode through the electrolytic liquid at the one end of the member, thereafter through said member to the opposite end thereof and through the electrolytic liquid at said other end of the member to said other electrode.

3. In a device of a type including a sealed housing tiltable in opposite senses and to a variable extent, an electrolytic liquid partially filling said housing so as to provide a bubble in an upper surface of the liquid, a pair of spaced electrodes in the housing, each of the electrodes having a surface area portion contactable with the electrolytic liquid, the electrolytic liquid for conducting a flow of electrical energy from one of the electrodes to the other of the electrodes, the bubble in the upper surface of the electrolytic liquid being movable relative to the electrodes for selectively contacting the surface area portions of the electrodes so as to vary the contact thereof with the electrolytic liquid dependent upon the sense and extent of tilting of the housing; the improvement comprising a longitudinally extending member of a low resistance electrically conductive material, said member extending in spaced relation to the surface area portions of the electrodes so as to provide a low resistance path for shunting a path of higher electrical resistance provided by the electrolytic liquid, one end of said member being spaced from the surface area portion of one of the electrodes and the opposite end of said member being spaced from the surface area portion of the other of said electrodes so that electrical energy may flow in a low resistance path parallel to the flow of electrical energy through said path of higher electrical resistance and serially from said one electrode through the electrolytic liquid at the one end of the member, thereafter through said member to the opposite end thereof and through the electrolytic liquid at said other end of the member to said other electrode.

References Cited in the file of this patent

UNITED STATES PATENTS

| | | |
|---|---|---|
| 2,713,726 | Dixson | July 26, 1955 |
| 2,713,727 | Balsam | July 26, 1955 |